(12) United States Patent
Seager

(10) Patent No.: US 10,598,535 B1
(45) Date of Patent: Mar. 24, 2020

(54) DISPENSER AND METHODS

(71) Applicant: Plastek Industries, Inc., Erie, PA (US)

(72) Inventor: Richard H. Seager, North Stonington, CT (US)

(73) Assignee: Plastek Industries, Inc., Erie, PA (US)

( * ) Notice: Subject to any disclaimer, the term of this patent is extended or adjusted under 35 U.S.C. 154(b) by 0 days.

(21) Appl. No.: 15/605,048

(22) Filed: May 25, 2017

Related U.S. Application Data

(60) Provisional application No. 62/342,014, filed on May 26, 2016.

(51) Int. Cl.
  *G01F 11/26* (2006.01)
  *B65D 1/02* (2006.01)
  *B65D 47/08* (2006.01)
  *B65D 47/32* (2006.01)

(52) U.S. Cl.
  CPC .......... *G01F 11/266* (2013.01); *B65D 1/0207* (2013.01); *B65D 1/0246* (2013.01); *B65D 47/0885* (2013.01); *B65D 47/32* (2013.01)

(58) Field of Classification Search
  CPC . G01F 11/266; B65D 47/0885; B65D 1/0207; B65D 1/0246; B65D 47/32
  See application file for complete search history.

(56) References Cited

U.S. PATENT DOCUMENTS

| 4,666,065 | A | | 5/1987 | Ohren | |
|---|---|---|---|---|---|
| 5,054,660 | A | | 10/1991 | Sherman et al. | |
| 5,078,305 | A | * | 1/1992 | Glynn | G01F 11/263 222/442 |
| 5,509,579 | A | * | 4/1996 | Robbins, III | B65D 47/0814 222/109 |
| 6,422,426 | B1 | | 7/2002 | Robbins, III et al. | |
| 9,567,140 | B2 | * | 2/2017 | Backaert | A47G 23/16 |
| 2006/0091153 | A1 | * | 5/2006 | Evans | G01F 11/26 222/1 |
| 2010/0147903 | A1 | * | 6/2010 | Farside | G01F 11/262 222/454 |
| 2015/0298875 | A1 | * | 10/2015 | Dagnelie | B65D 47/12 222/465.1 |
| 2017/0328758 | A1 | * | 11/2017 | Fuchs | G01F 11/44 |

FOREIGN PATENT DOCUMENTS

| WO | 96/03625 A1 | 2/1996 |
|---|---|---|
| WO | 2012/050949 A2 | 4/2012 |
| WO | 2012/094588 A2 | 7/2012 |
| WO | 2015/006297 A1 | 1/2015 |

OTHER PUBLICATIONS

International Search Report and Written Opinion for PCT/US2014/045703, dated Oct. 23, 2014.

* cited by examiner

*Primary Examiner* — Donnell A Long
(74) *Attorney, Agent, or Firm* — Bachman & LaPointe, P.C.

(57) ABSTRACT

A dosing bottle closure (24) has a body (26) and a lid (27). The body (26) has: a sidewall (50) extending from a lower rim (54) to an upper rim (62); and means (58) along the sidewall (50) for engaging a container body (22). The lid (27) is hinged relative to the body for articulation between a closed condition and an open condition. The body defines an internal upwardly open chamber (25) at least partially covered by the lid in the closed condition. The body defines a feed passageway (100) having an outlet (110) to the chamber (25) and spaced above a bottom (72) of the chamber and defines a vent conduit (300).

26 Claims, 10 Drawing Sheets

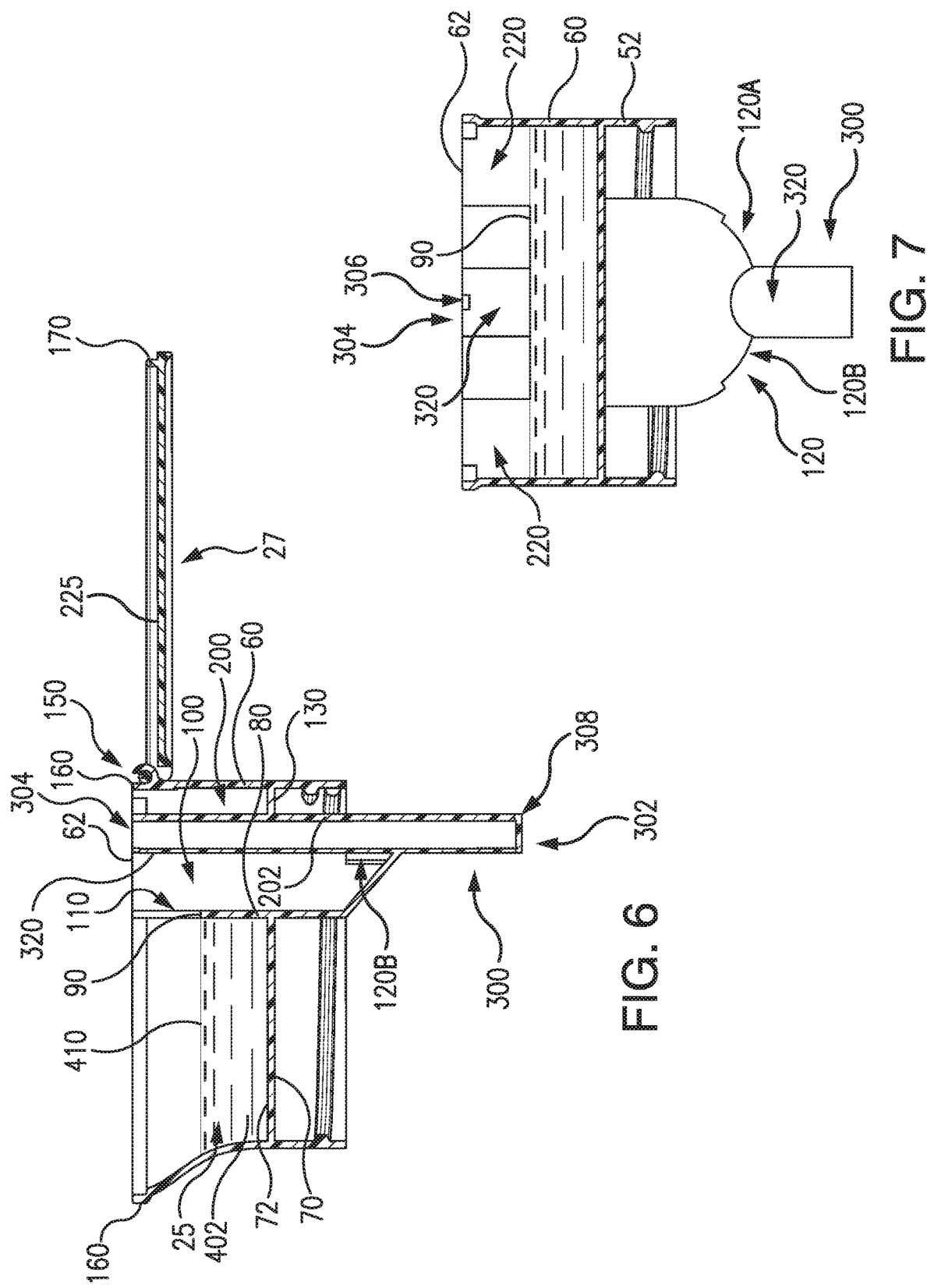

DISPENSER AND METHODS

CROSS-REFERENCE TO RELATED APPLICATION

Benefit is claimed of U.S. Patent Application No. 62/342,014, filed May 26, 2016, and entitled "Dispenser and Methods", the disclosure of which is incorporated by reference herein in its entirety as if set forth at length.

BACKGROUND OF THE INVENTION

The invention relates to dispensing of liquids such as detergents, fabric softeners, insecticides, fertilizers and the like. More particularly, the invention relates to dosing bottles.

Exemplary flowable materials are laundry detergent, fabric softener, and home and garden chemicals (e.g., fertilizers, pesticides, insecticides).

Conventionally in such fields, dosing may be achieved via providing a combined cap and measuring cup. Exemplary such caps/cups have installed conditions screwed onto a spout fitment to close/seal a bottle.

One recently-proposed dispenser is found in International Patent Application No. PCT/US14/45703, "Dispenser and Methods", filed Jul. 8, 2014, of inventor Richard H. Seager.

In other fields, a number of dosing bottles have been proposed.

SUMMARY OF THE INVENTION

One aspect of the invention involves a dosing bottle closure that has a body and a lid. The body has: a sidewall extending from a lower rim to an upper rim; and means along the sidewall for engaging a container body. The lid is hinged relative to the body for articulation between a closed condition and an open condition. The body defines an internal upwardly open chamber at least partially covered by the lid in the closed condition. The body defines a feed passageway having an outlet to the chamber and spaced above a bottom of the chamber and defines a vent conduit.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6 is a central vertical longitudinal sectional view of the closure of FIG. 5, taken along line 6-6.

FIG. 7 is a central vertical transverse sectional view of the closure of FIG. 5 taken along line 7-7.

Like reference numbers and designations in the various drawings indicate like elements.

DETAILED DESCRIPTION

An illustrated embodiment of a closure is a two-piece closure based on the second illustrated embodiment of PCT/US14/45703. The closure's lid and body are shown as separate pieces forming respective halves of a hinge. Alternative embodiments may be modifications of alternative baselines or may be clean sheet designs and may include one piece closures (i.e., with a living hinge) or greater. Modifications relative to PCT/US14/45703 facilitate dispensing of liquid by enhancing venting of the closure during a charging/filling of the closure. This is particularly relevant to facilitate dispensing of liquid which may otherwise vent airflow into the container body during charging of the closure.

Figure 1:
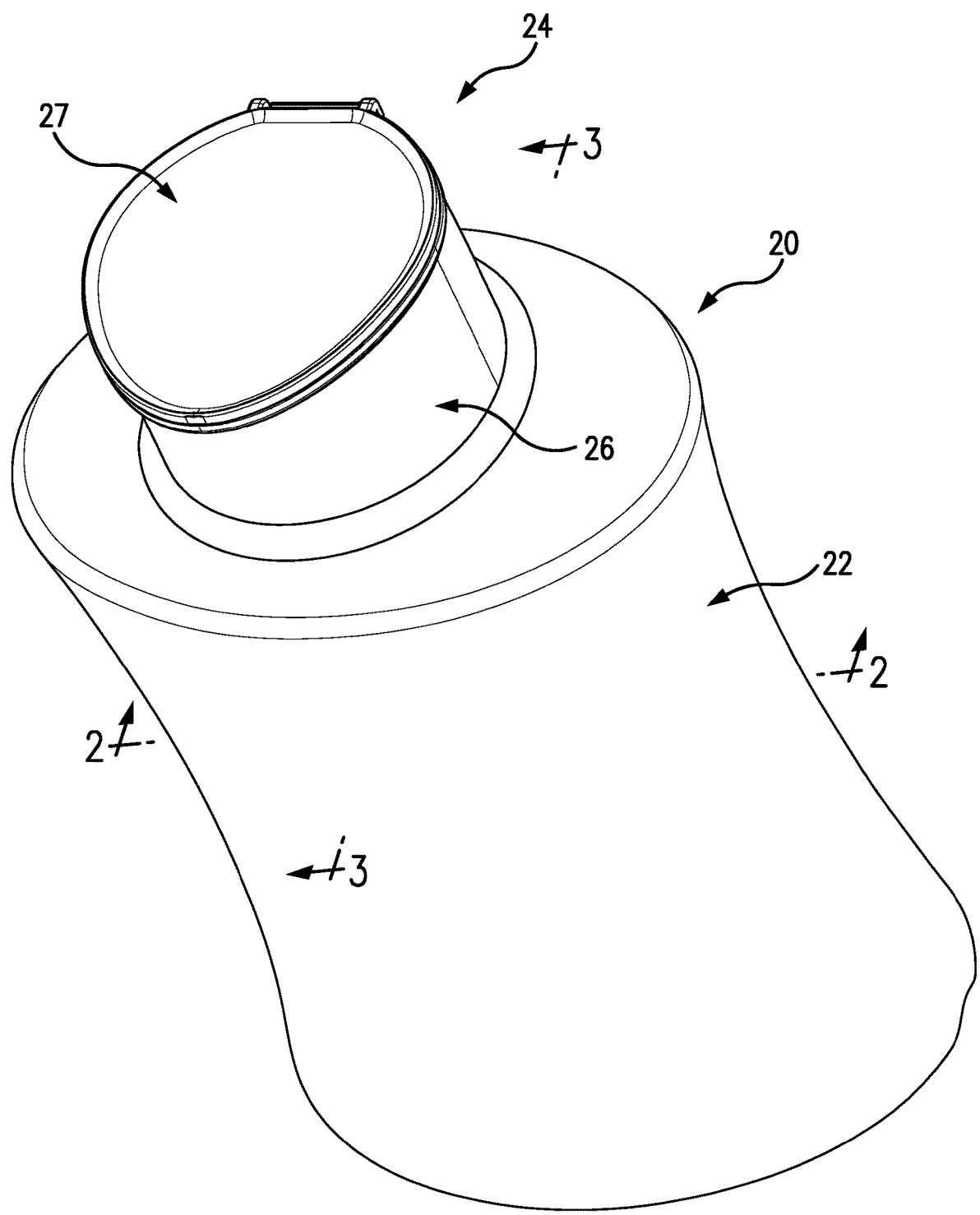
FIG. 1 is a view of a container having a first closure.
Figure 2:
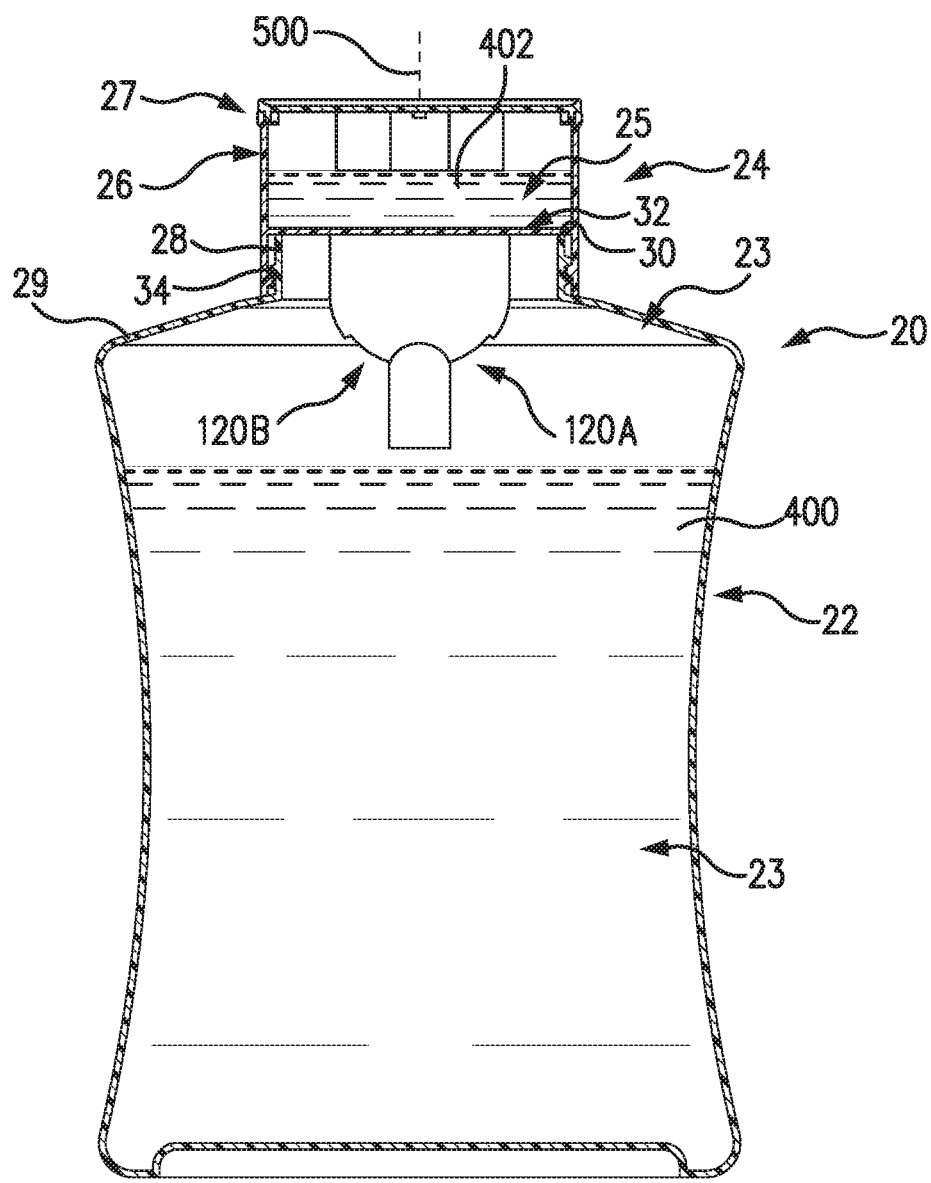
FIG. 2 is a central transverse vertical sectional view of the container of FIG. 1 taken along line 2-2.

An exemplary container 20 comprises a bottle body or container body 22 and a closure 24. The exemplary bottle body has an interior 23 (FIG. 2) forming a reservoir containing a body 400 of flowable material. The closure defines a dosing chamber 25 which may, in various stages of operation, receive, hold and dispense a dose or charge 402 of the flowable material. Although the flowable material may be solid (e.g., granular/powder), the exemplary material is liquid (unless explicitly indicated otherwise which may include solid suspensions in a liquid carrier).

The closure comprises a body 26 and a lid, cap, or cover 27. Exemplary bottle body, closure body, and closure lid materials are molded plastics such as various polyethylenes and polypropylenes.

An exemplary bottle body (injection blow molded) 22 (FIG. 2) has a neck 28 extending upward from a shoulder 29 about a central longitudinal/vertical axis 500 to a rim 30 defining an open mouth 32. The neck has an external thread 34 (or other feature) for mounting the closure body. The exemplary thread 34 is a double lead thread. An exemplary closure body (injection molded) 26 screws onto the bottle neck/mouth and may lock with a lug or detent (not shown) thereon to prevent counter-rotation and extraction.

Figure 3:
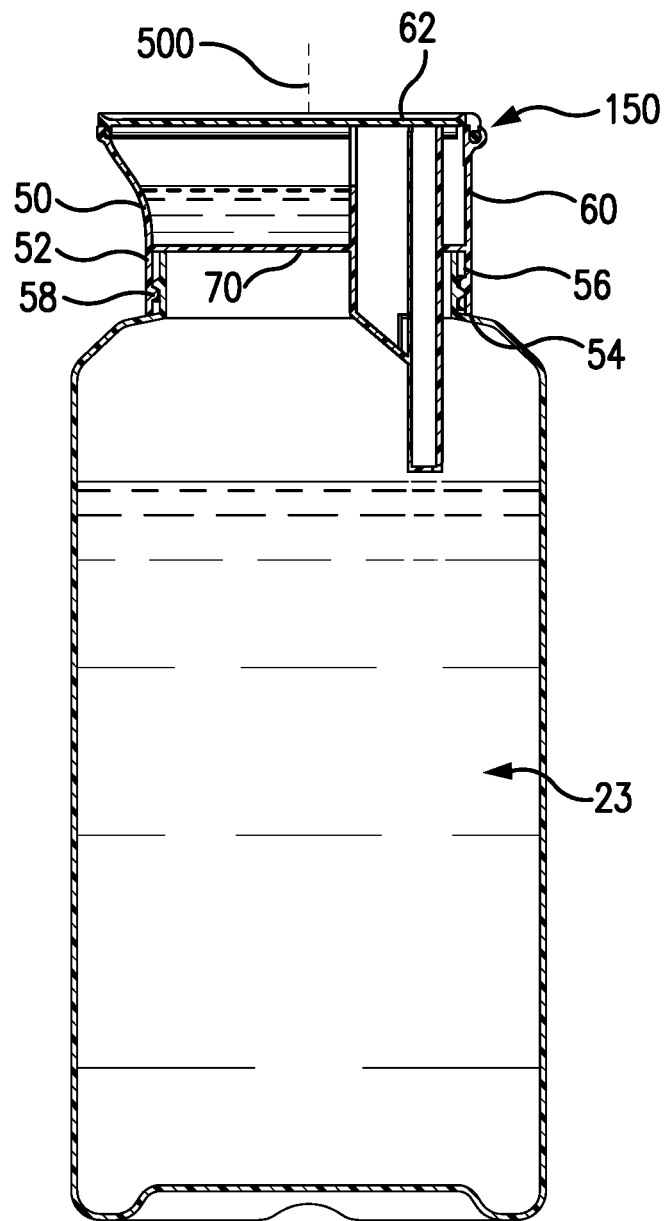
FIG. 3 is a central vertical longitudinal sectional view of the container of FIG. 1 taken along 3-3.
Figure 4:
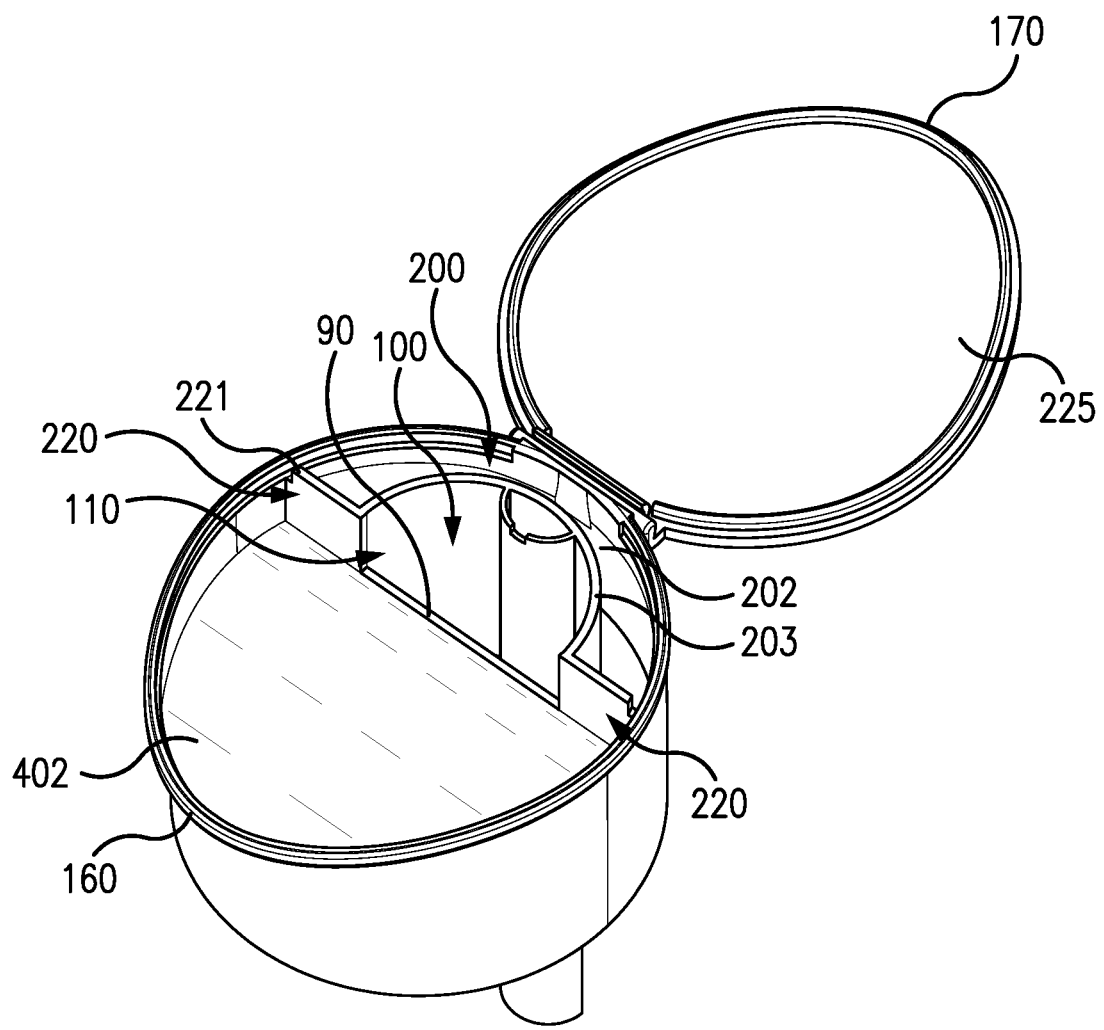
FIG. 4 is a view of the first closure in an open condition containing a charge of material.

The exemplary closure body 26 comprises an outer wall 50 (sidewall) (FIG. 3). A lower portion 52 of the wall 50 extends upward from a lower rim 54 and has an interior (inner diameter (ID)) surface 56 bearing an internal thread 58 for engaging the bottle body thread 34. An upper portion 60 of the wall 50 extends upward to a rim 62. A transverse web 70 (FIG. 6) has a perimeter at a junction of the wall portions 52 and 60. An upper surface 72 (or a portion thereof) of the web 70 forms an underside of the chamber 25 containing the dose 402 of material. Laterally, the chamber 25 is partially bounded by the upper wall portion 60 and partially bounded by a transverse wall 80. In the exemplary embodiment, a central portion of the wall 80 extends upward from the web 70 to an upper edge 90 to separate the chamber 25 from a feed passageway 100. Edge 90 is recessed below the rim 62 to create a gap 110 (FIG. 4). The gap 110 forms an outlet of the feed passageway 100 during charging. In the exemplary embodiment, a partial flowback is permitted through the gap 110 over the edge 90 (which serves as a weir) to determine the height of the upper surface 410 (FIG. 6) of the dose/charge 402 when the container is uprighted after charging.

An inlet 120 (FIG. 6) comprising ports 120A, 120B (FIG. 7) to the feed passageway 100 may be formed at a lower end of the feed passageway 100.

Exemplary dose volume is one fluid ounce (30 ml), more broadly 5-75 ml or 15-50 ml. Exemplary bottle interior volume is about 32 fluid ounces (one liter, more broadly, 0.4-4.0 liter or 0.4-2.0 liter) (e.g. sufficient to contain that much flowable material). FIG. 3 also shows an exemplary bottle as having a sidewall extending upward to the shoulder from a base or bottom (which may support the bottle in a standing condition).

For providing a seal of the closure body to the bottle body, the closure body and bottle body may have complementary sealing surfaces which engage each other in the installed condition. A first sealing surface of the bottle body is formed by the rim 30. Its complementary first sealing surface of the closure body member is formed by a peripheral annular portion of the underside 130 (FIG. 6) of the web 70.

FIG. 6 furthers shows the lid 27 connected to the closure body by a hinge 150. The exemplary lid and body have interfitting sealing and locking features. For sealing, an uppermost portion 160 of the sidewall upper portion 60 receives a sidewall portion 170 of the lid in the closed condition. Exemplary detented locking in the closed condition may be provided by interfitting features (e.g., projections (not shown) of the lid and body).

Figure 5:
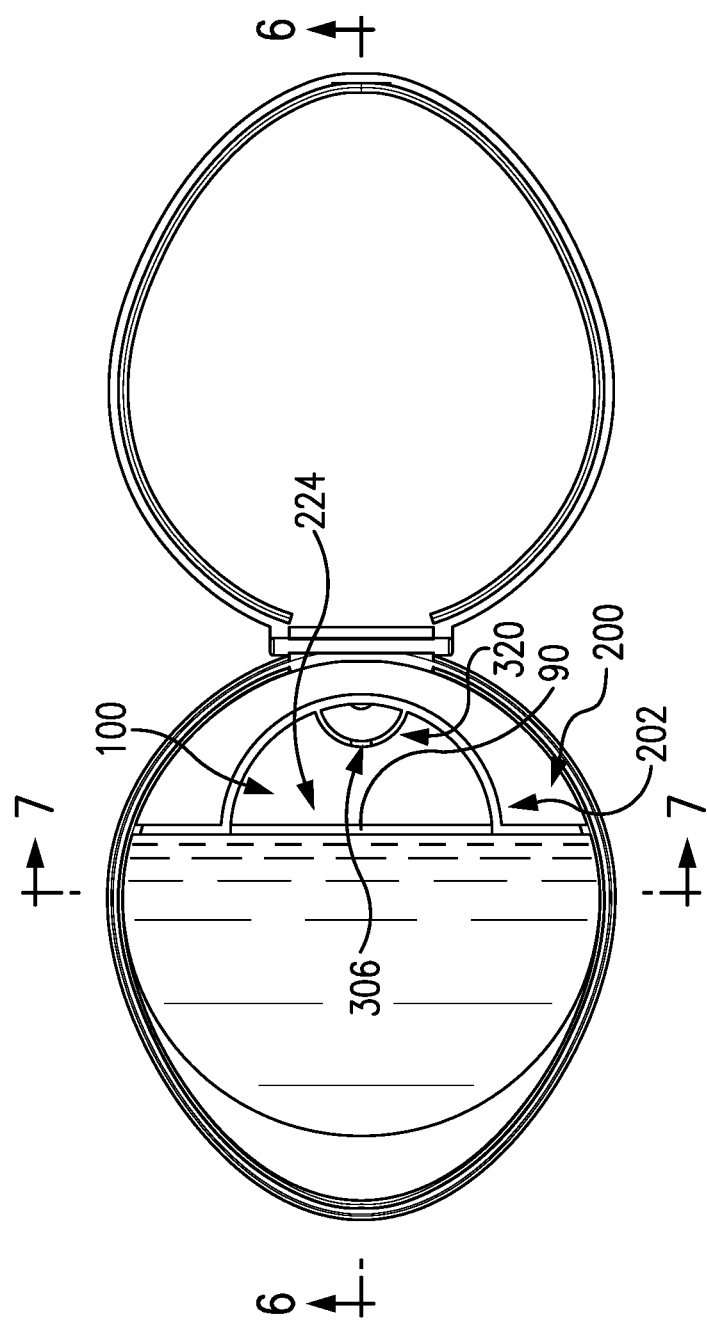
FIG. 5 is a top view of the closure of FIG. 4.
Figure 8:
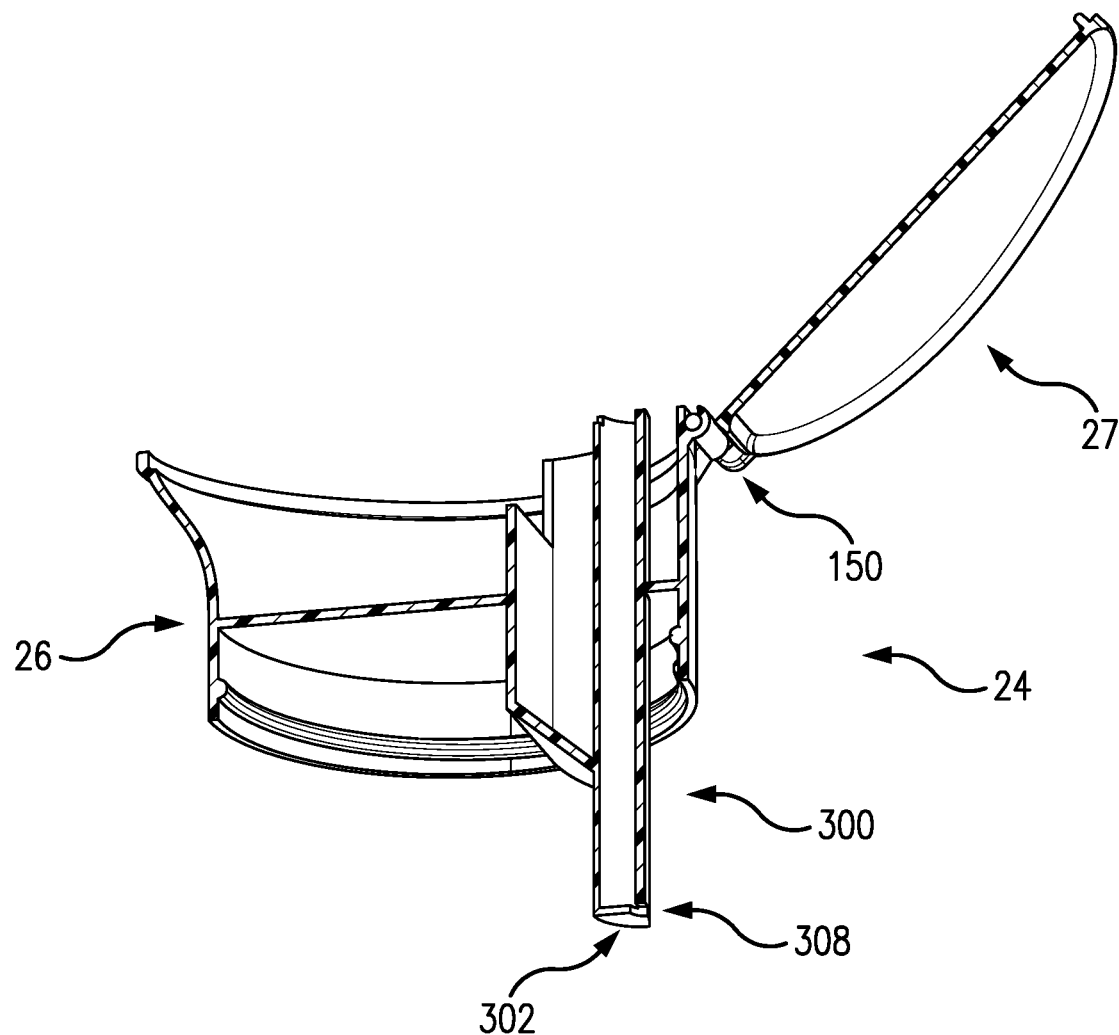
FIG. 8 is a central vertical longitudinal cutaway view of the closure in an open condition.

FIG. 6 also shows a partial annular dead chamber 200 alongside of and behind the feed passageway 100 and separated therefrom by an arcuate wall 202. The dead chamber 200 may be separated from a head space above the dosing chamber 25 by lateral portions 220 (FIG. 4) of the wall 80 above the central portion 90 of the upper edge (above a central portion 224 (FIG. 5) of the wall 80). The upper edge 203 of the wall 202 and the upper edges 221 of lateral portions 220 extend upward to meet with the underside 225 of the lid in the closed condition to seal off the dead chamber in the closed condition. The lower extreme of the dead chamber is bounded by an annular segment of the upper surface 72 of the web 70.

As noted above, a specific modification relative to PCT/US2014/45703 involves the addition of a vent tube 300 (FIG. 6) to the closure body. The vent tube extends from a lower end 302 to an upper end 304. The exemplary upper end is open near the rim 62 with a slight vertical recess 306 so that the upper end does not seal against the lid underside 225 when the lid is closed. The recess 306 thus forms a port at the tube upper end even if the lid underside contacts the upper end. This port 306, along with another port 308 at the lower end 302, allows the passage of air between the interior of the closure (e.g., the dosing chamber 25) and the interior 23 of the body during charging. In the exemplary embodiment, the tube 300 is formed along an upper rear portion by the wall 202 and has an arcuate forward wall 320 (FIG. 6). Vent tube dimensions will depend on factors including the container size, container geometry, and the initial fill level. Typically, its lower (in the upright condition) port 308 will be below the feed passageway inlet 120 and aft of the inlet 120 to be above the inlet 120 and above the liquid surface when the container is partially inverted to load/charge a dose.

A relatively long vent tube (e.g., 3-10 cm or more below the inlet 120) is desirable from a fluid handling point of view. However, when made as a single molding including the feed passageway as well, manufacturability concerns may dominate. For example, tool release of the vent tube from the tooling forming its interior without damaging the part acts as a limiting factor on length. Typically this may make the length in the range of 0.50 to 3.0 cm. Even less (e.g., including ranges of up to 3.0 cm or up to 2.0 cm or up to 1.0 cm or up to 0.5 cm with exemplary lower limits, if any, of 0.1 cm or 0.2 cm) may be possible due to the need to extract the tooling from the portion of the vent tube above the inlet 120. A rearward shift of the port 308 relative to the inlet 120 may be an exemplary 0.20-0.50 cm.

In the exemplary embodiment, at least when the container is full, the surface of the liquid in the container may be below (e.g., FIGS. 2 and 3) or may extend into the interior of the tube 300. Even in the latter situation, as the container is depleted, the surface will eventually go below the level of the port 308 when upright.

Figure 9:
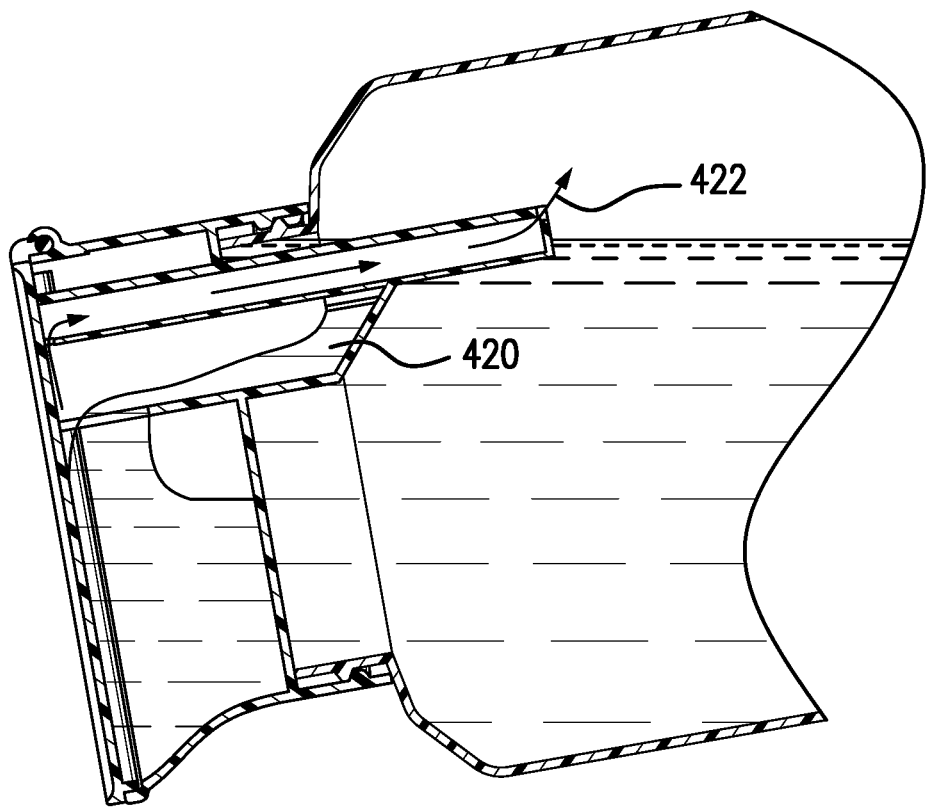
FIG. 9 is a partial central vertical longitudinal sectional view of the container in a charging condition.
Figure 10:
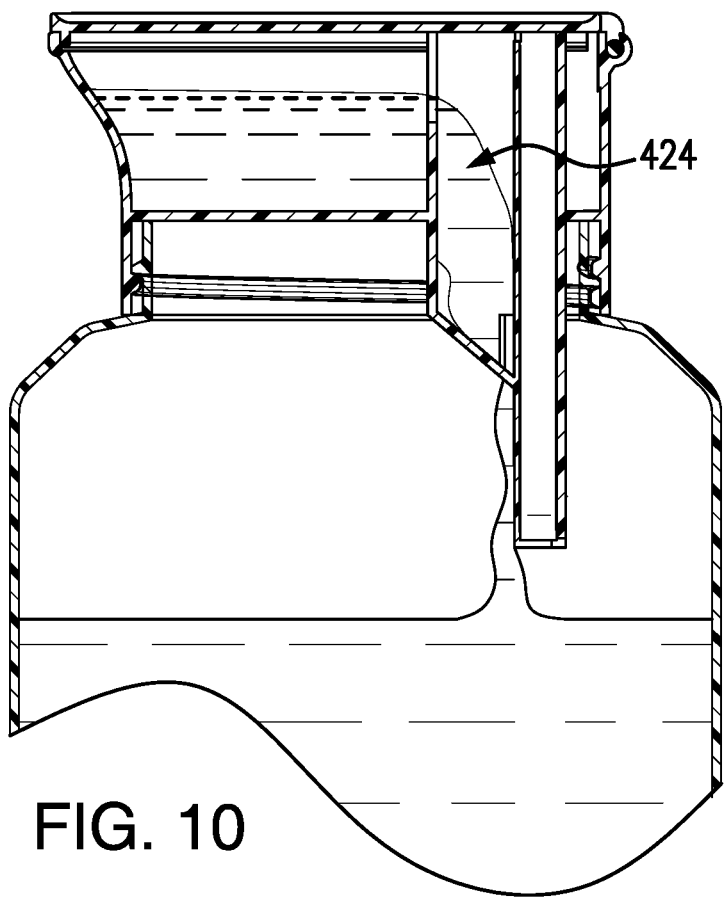
FIG. 10 is a partial central vertical longitudinal sectional view of the container in a drainback condition.

In an exemplary charge/discharge sequence, the lid is initially closed and the container upright. The container is then fully or partially inverted (e.g., a partial inversion to the FIG. 9 condition). Material flows 420 from the interior 23 downward through the inlet 120 into the passageway 100 and out the outlet 110 into dosing chamber 25. While this is occurring, a flow 422 of air may pass in a generally reverse direction through the tube 300 from the dosing chamber 25 through the port 306, through the tube interior, and out the port 308 into the container body interior 23 outside the tube 300. This allows make-up for the liquid passing into the closure and provides smooth operation (prevents glugging). The container is then uprighted (e.g., to the FIG. 10 condition) and any excess material in the closure will return (return flow 424 shown in FIG. 10) through the outlet 110 over the weir 90 and back into the bottle interior leaving a desired volume for the charge 402 in chamber 25 (e.g., the first embodiment FIG. 3 condition). During this flow-back process, air may pass back into the closure from the interior 23 entering the tube 300 through the port 308 and exiting through the port 306. The FIG. 9 and FIG. 10 drawings are conceptually illustrative. The exact nature and timing of flows will depend on many factors including the viscosity of the liquid, the speed of inverting and uprighting, the fullness of the container, and geometry (including things like the size of the various ports and passageways).

Figure 11:
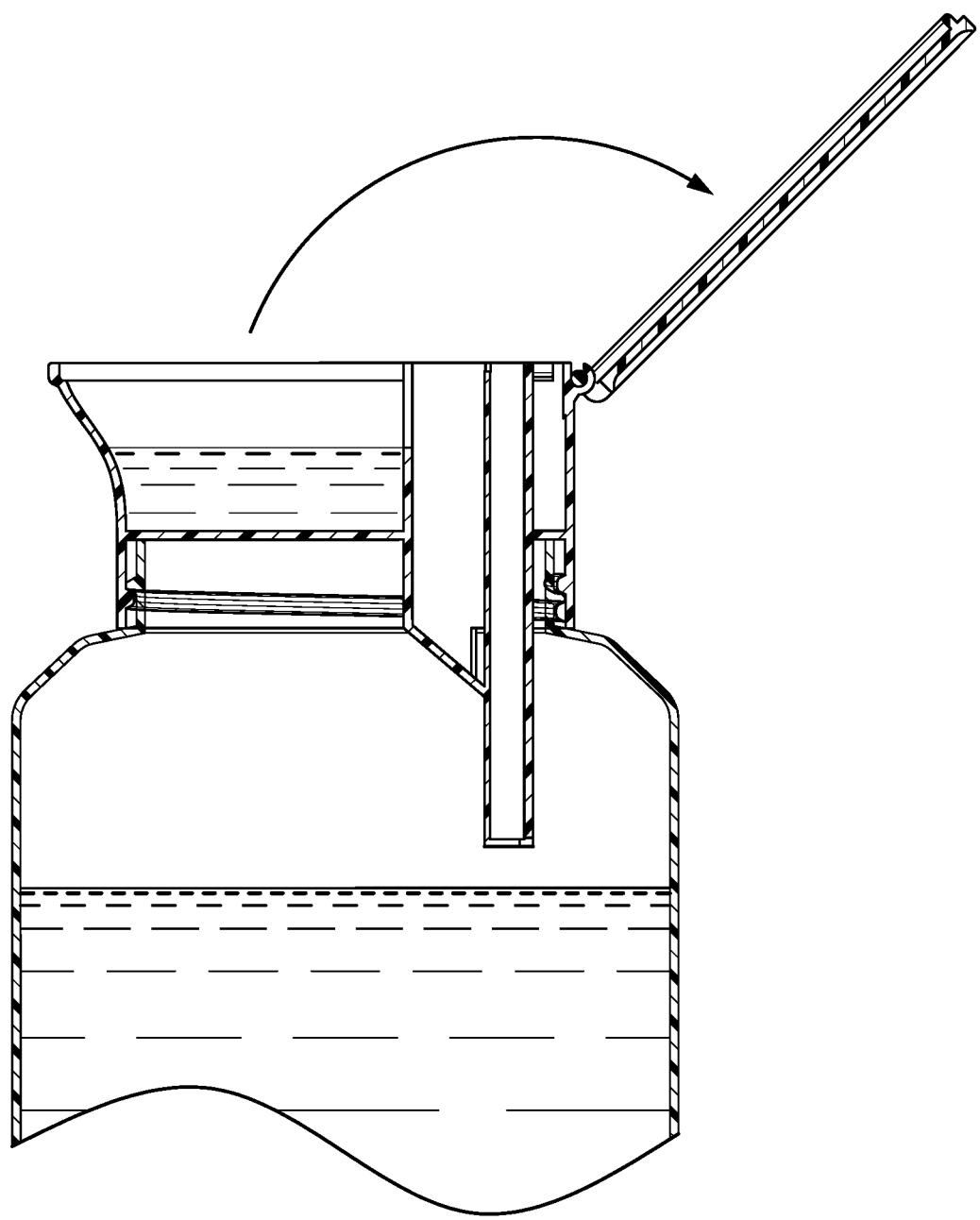
FIG. 11 is a partial central vertical longitudinal sectional view of the container upon opening after the drainback.
Figure 12:
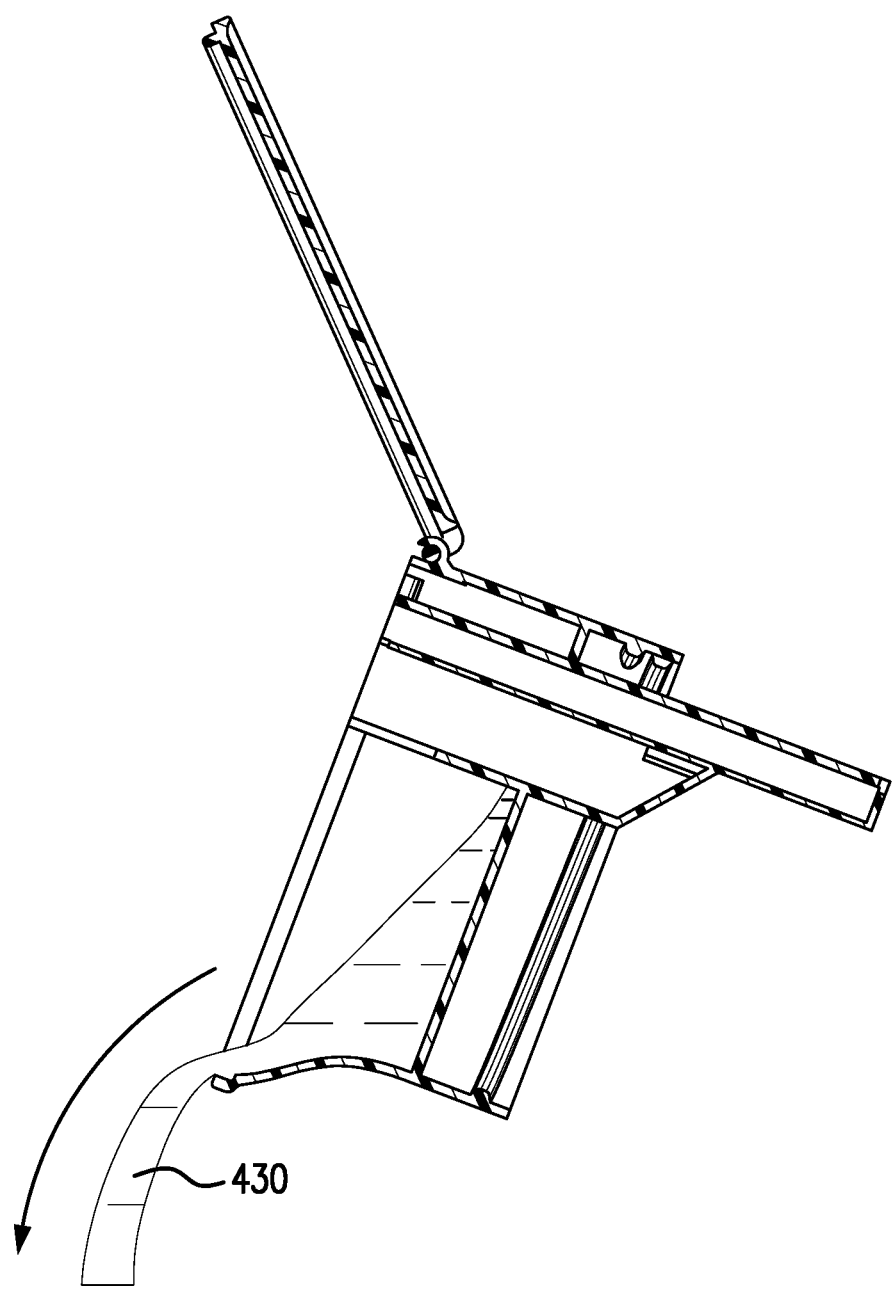
FIG. 12 is a central vertical longitudinal sectional view of the closure during pouring/discharge.

Thereafter, the lid may be opened (FIG. 11) and the container body tilted to pour (FIG. 12). To facilitate pouring, the sidewall upper portion 60 at the front is angled outward to form a partial spout, thereby, reducing the angle by which the bottle must be tilted to pour from the chamber 25. This facilitates the prevention of any further material passing through the feed passageway during pouring. The exemplary embodiment has the feed passageway inlet to the rear of the closure, and, thereby, relatively high during pouring to prevent material from entering the inlet. Similarly, the location of the port 308 toward the rear prevents liquid from passing through the tube 300 during pouring.

After pouring, the container is re-uprighted and the lid closed (in any order). Thereafter, the process may be repeated by inverting to charge.

One or more embodiments of the present invention have been described. Nevertheless, it will be understood that various modifications may be made without departing from the spirit and scope of the invention. For example, the nature of the particular product to be dispensed may influence details of any particular embodiment. The bottle body may be based on the overall configuration of an existing or yet-developed conventional bottle for such product. Tamper-evident features may also be included. Accordingly, other embodiments are within the scope of the following claims.

What is claimed is:

1. A dosing bottle closure (24) comprising:
a body (26) comprising:
a sidewall (50) extending from a lower rim (54) to an upper rim (62); and
means (58) along the sidewall for engaging a container body (22); and
a lid (27) hinged relative to the body for articulation between a closed condition and an open condition,
wherein:
the body defines an internal upwardly open chamber (25) at least partially covered by the lid in the closed condition;
the body defines:
a feed passageway (100) having an outlet (110) to the chamber (25); and
a vent conduit (300);
the vent conduit has a first opening (306) and a second opening (308);
with the closure upright, the first opening is an upper opening;
with the closure upright, the second opening is a lower opening;
with the closure upright, the second opening is a lower opening to the rear of an inlet (120) of the feed passageway; and
with the closure upright, the vent conduit extends downward below said inlet (120) of the feed passageway.

2. The closure (24) of claim 1 wherein:
the vent conduit extends downward below said inlet of the feed passageway by at least 5.0 mm.

3. The closure (24) of claim 1 wherein
the vent conduit is along a rear of the feed passageway.

4. The closure (24) of claim 1 wherein
said inlet (120) of the feed passageway comprises a pair of ports (120A, 120B) on opposite sides of the vent conduit.

5. The closure (24) of claim 4 wherein
the vent conduit is along a rear of the feed passageway.

6. The closure (24) of claim 1 wherein
the outlet of the feed passageway is spaced above a bottom (72) of the chamber.

7. The closure (24) of claim 1 wherein the body and lid are molded as separate pieces.

8. The closure of claim 1 wherein:
a hinge (150) defines a rear end of the body; and
an open top second chamber (200) is between the feed passageway and the hinge.

9. The closure of claim 8 wherein:
the lid closes the second chamber in the closed condition.

10. The closure of claim 8 wherein:
lateral portions (220) of a wall (80) separate the chamber from the second chamber; and
a central portion (224) of the wall having a vertically recessed upper edge (90) separates the chamber from the feed passageway.

11. The closure of claim 1 wherein:
said inlet (120) of the feed passageway is spaced below the bottom of a chamber.

12. The closure of claim 11 wherein:
a hinge (150) defines a rear end of the body; and
the inlet faces at least partially rearward.

13. The closure of claim 1 wherein:
the chamber has a volume of 15-75 ml.

14. A container (20) comprising:
a container body (22) having an interior (23) for storing a flowable material;
the closure of claim 1 secured to the container body.

15. The container of claim 14 wherein:
the container body is polyethylene; and
the closure body and lid are polypropylene.

16. The container of claim 14 further comprising:
a flowable material (400) within the container body.

17. The container of claim 16 further comprising:
the flowable material is a liquid.

18. The container of claim 16 further comprising:
the flowable material is a detergent.

19. The container of claim 14 wherein:
the container body interior has a volume of 0.4-2.01.

20. A method for using the container of claim 14 comprising:
tilting the container with the lid in the closed condition to transfer a first dose of material from the interior through the feed passageway while venting air from the closure to the interior through the vent conduit;
uprighting the container to leave some of the material in the chamber with the vent conduit first opening above the material;
opening the lid to the open condition; and
tilting the container to pour at least a portion of the first dose from the container.

21. The method of claim 20 further comprising:
after the pouring, reuprighting the container and closing the lid; and
repeating the tilting, uprighting, opening, and tilting.

22. A dosing bottle closure (24) comprising:
a body (26) comprising:
a sidewall (50) extending from a lower rim (54) to an upper rim (62); and
means (58) along the sidewall for engaging a container body (22); and
a lid (27) hinged relative to the body for articulation between a closed condition and an open condition,
wherein:
the body defines an internal upwardly open chamber (25) at least partially covered by the lid in the closed condition;
the body defines:
a feed passageway (100) having an outlet (110) to the chamber (25); and
a vent conduit (300);
the vent conduit extends downward below an inlet to the feed passageway by at least 5.0 mm; and
the vent conduit is along a rear of the feed passageway.

23. The closure (24) of claim 22 wherein
an inlet (120) of the feed passageway comprises a pair of ports (120A, 120B) on opposite sides of the vent conduit.

24. A dosing bottle closure (24) comprising:
a body (26) comprising:
a sidewall (50) extending from a lower rim (54) to an upper rim (62); and
means (58) along the sidewall for engaging a container body (22); and
a lid (27) hinged relative to the body for articulation between a closed condition and an open condition,
wherein:
the body defines an internal upwardly open chamber (25) at least partially covered by the lid in the closed condition;
the body defines:
a feed passageway (100) having an outlet (110) to the chamber (25); and
a vent conduit (300); and
the body is configured to introduce a dose of material through the feed passageway while venting air from the closure through the vent conduit container in a partially inverted condition and then retain the dose in the chamber when fully uprighted.

25. The closure (24) of claim 24 wherein the vent conduit first port comprises a vertical recess in an upper end of the vent conduit forming a port between the vent conduit and the lid.

26. The closure (24) of claim 24 wherein an inlet (120) of the feed passageway comprises a pair of ports (120A, 120B) on opposite sides of the vent conduit.

* * * * *